UNITED STATES PATENT OFFICE.

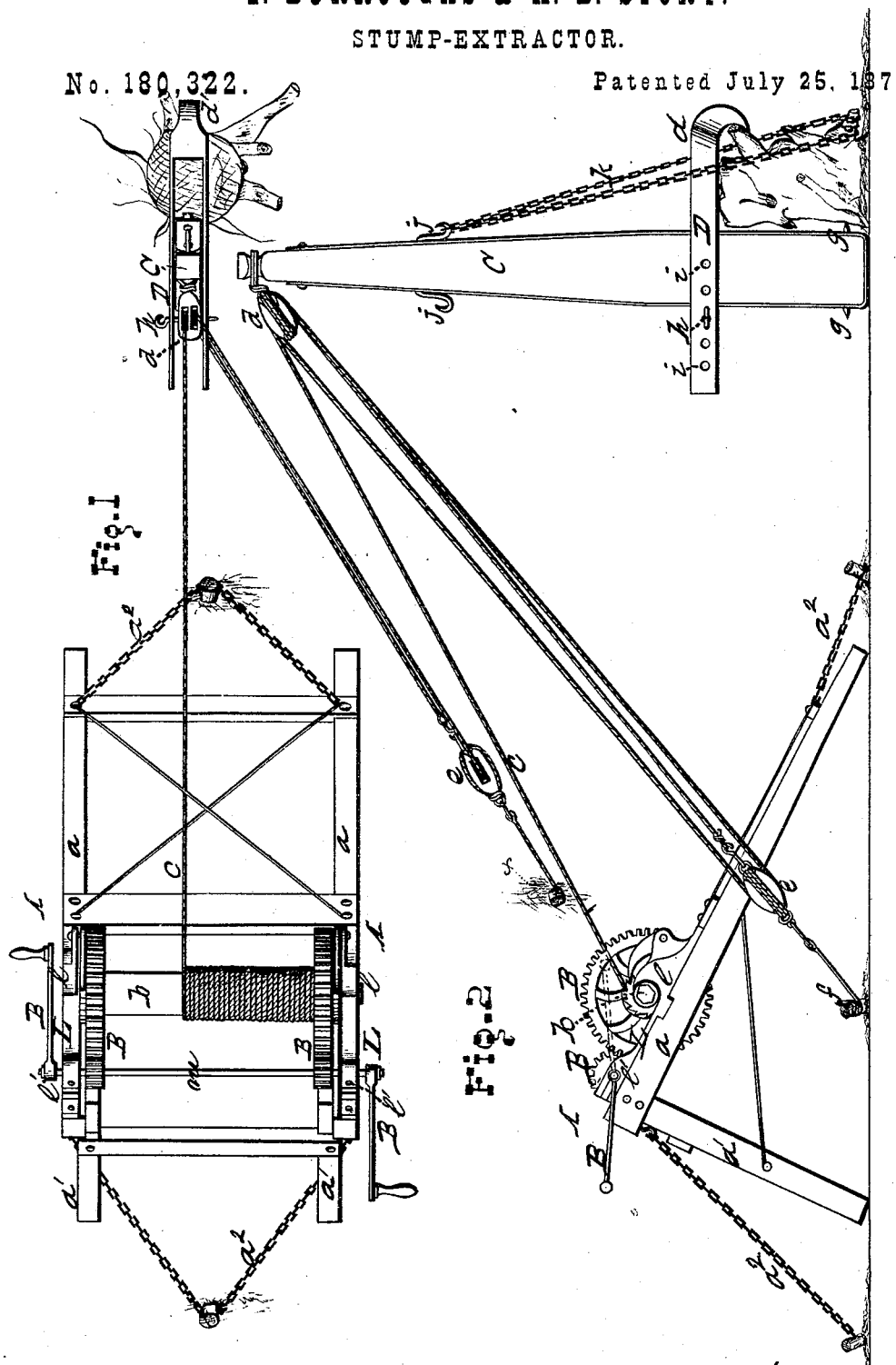

ZEPHENIAH BURROUGHS AND AARON B. STORY, OF EPWORTH, IOWA.

IMPROVEMENT IN STUMP-EXTRACTORS.

Specification forming part of Letters Patent No. 180,322, dated July 25, 1876; application filed February 26, 1876.

*To all whom it may concern:*

Be it known that we, ZEPHENIAH BURROUGHS and AARON B. STORY, of Epworth, in the county of Dubuque and State of Iowa, have invented certain new and useful Improvements in Stump-Extractors; and we do hereby declare the following to be a full, clear, and exact description thereof, which will enable others skilled in the art to which it appertains to make and use the same, reference being had to the accompanying drawing, and to the letters of reference marked thereon, which form a part of this specification, in which—

Figure 1 is a plan view of our improved stump-extractor, and Fig. 2 is a side elevation thereof.

Corresponding parts in the two figures are designated by like letters.

This invention relates to a certain improvement in stump-extractors, having for its object not only the pulling of stumps, but also trees; and it consists of mechanism adapted to that purpose, substantially as hereinafter more fully set forth.

In the annexed drawing, A refers to the windlass-supporting frame, the bed-pieces $a\,a$ thereof being inclined, as shown in Fig. 2, by which their lower ends may rest against or be inserted in the ground to resist the pulling force of the machine, their upper ends being supported upon and secured to legs $a^1\,a^1$, preferably inclined, as shown. The frame A may be chained down in position, as shown at $a^2\,a^2$. This method of chaining the machine down in place acts as a pivot, from which it may work in all directions, one of the chains being first released. B B refer to the windlass mechanism, to the axis $b$ of which is attached a rope or chain, $c$, extending to and through tackle-block $d$; thence through single pulley-block $e$, fastened to a stake, $f$; thence back over a second pulley in the tackle-block $d$, and finally back to the single pulley-block $e$, to which it is fastened, as shown or otherwise. The double pulley-block $d$ is secured to the upper end of an upright lever, C, in contact with the stump to be extracted. Its lower end may be armed with points $g$, to penetrate the stump and assist the holding of said end in position. D is a bifurcated bar, which receives the upright lever C, and to which it is confined by a pin or key, $h$, passing through any two of a series of holes, $i\,i\,i$, in the bar D, and provided with a hook, $d'$, fitting down over the stump. The holes $i\,i\,i$ permit of the adjustment of the hooked lever D to different-sized stumps. Upon either side of the lever C is a hook, $j\,j$, for the attachment of a chain, $k$, passing under a root of the stump, to give the lever D additional purchase upon the stump.

In pulling down trees the tackle and levers are dispensed with, and the rope or chain $c$ carried directly and fastened to the tree, and the process of extracting performed by operating the windlass.

L L are bed-irons, having the hooked projections $l\,l$ and the slots $l'\,l'$, forming bearings, respectively, for the axis or drum $b$ and the axle or rod $m$, to which are attached pinions and the handles of the windlass. By this construction of bed-iron the windlass mechanism can be readily detached therefrom, rendering the machine lighter, to facilitate its removal from place to place about the field.

Having thus described our invention, what we claim, and desire to secure by Letters Patent, is—

1. The bed-irons L L, having the hooked projections $l\,l$ and slots $l'\,l'$, for detachably journaling the windlass mechanism, substantially as set forth.

2. In combination with the bed-irons L L, having the hooked projections $l\,l$ and slots $l'\,l'$, the windlass mechanism B B $b$ and frame A, substantially as and for the purpose set forth.

3. The frame A and windlass mechanism B B $b$, in combination with the tackle and blocks $c\,d\,e$, lever C, hooked bar D, and key $h$, substantially as and for the purpose set forth.

In testimony that we claim the foregoing as our own we hereunto affix our signatures in the presence of two witnesses.

ZEPHENIAH BURROUGHS.
AARON B. STORY.

Witnesses:
J. J. BRADLEY,
FRANK JENNINGS.